Figure 1:
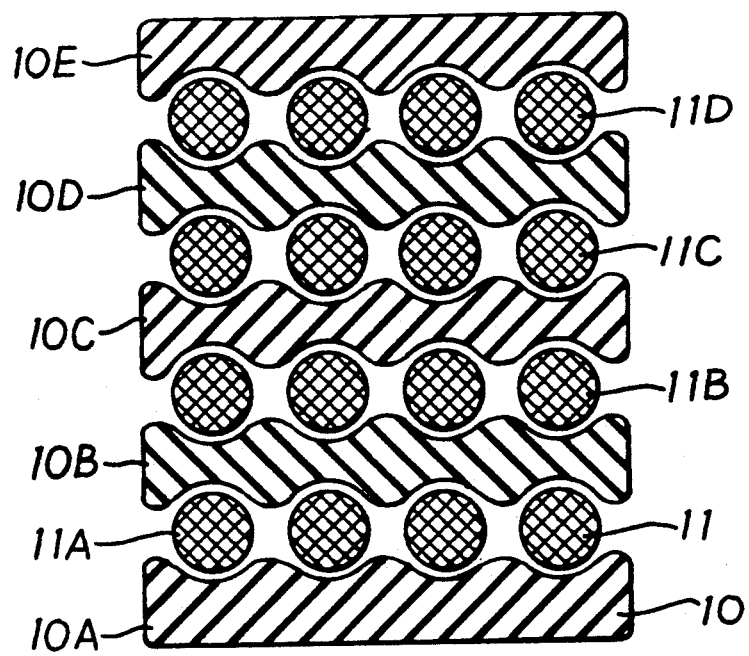

United States Patent [19]

Holroyd et al.

[11] Patent Number: 5,100,490
[45] Date of Patent: Mar. 31, 1992

[54] METHOD FOR CONSTRUCTING A BEAD REINFORCEMENT WITH ALTERNATE WINDINGS OF POLYMERIC MATERIAL AND AXIALLY SPACED APART WINDINGS OF A WIRE

[75] Inventors: Eric Holroyd, Knutsford, England; Anthony R. Wright, Southport, United Kingdom

[73] Assignee: Bridgestone/Firestone, Inc., Arkon, Ohio

[21] Appl. No.: 474,128

[22] PCT Filed: Nov. 14, 1988

[86] PCT No.: PCT/GB88/00984

§ 371 Date: May 1, 1990

§ 102(e) Date: May 1, 1990

[87] PCT Pub. No.: WO89/04259

PCT Pub. Date: May 18, 1989

[30] Foreign Application Priority Data

Nov. 13, 1987 [GB] United Kingdom ............... 8726627

[51] Int. Cl.⁵ ................. B29D 30/48; B60C 15/04
[52] U.S. Cl. .................... 156/136; 152/539; 152/540; 245/1.5; 428/295; 156/161; 156/171
[58] Field of Search ............ 156/110.1, 117, 130.3, 156/130.7, 131, 132, 135, 136, 141, 143, 398, 400, 403, 422, 161, 164, 171, 173; 152/539, 540, 544, 545, 547; 428/295, 302, 294; 245/1.5

[56] References Cited

U.S. PATENT DOCUMENTS

| | | | |
|---|---|---|---|
| 1,046,211 | 12/1912 | Milton | 156/171 |
| 1,681,680 | 8/1928 | Pierce | 245/1.5 |
| 4,477,301 | 10/1984 | Bouju | 156/291 |
| 4,823,857 | 4/1989 | Orjela et al. | 245/1.5 |
| 4,967,821 | 11/1990 | Holroyd et al. | 152/540 |

FOREIGN PATENT DOCUMENTS 3613350 10/1987 Fed. Rep. of Germany.
1281439 12/1960 France.
58-145509 8/1983 Japan.

*Primary Examiner*—Michael W. Ball
*Assistant Examiner*—Gregory J. Wilber
*Attorney, Agent, or Firm*—Sughrue, Mion, Zinn Macpeak & Seas

[57] ABSTRACT

The reinforcement for the bead of e.g. a pneumatic type, a rolling lobe diaphragm or an air spring is constructed by winding onto a mandrel or former superimposed layers alternately of unsheathed wire and flat, uncured rubber strip. Rubber is wound on before wire winding commences and continues after wire winding stops, so that the assembly exposes no cut wire end. After the winding operation the assembly is subjected to heat and pressure with all the wire embedded in and surrounded by an integrated, vulcanized rubber body.

The rubber layers may be parallel with and on opposite sides of the layers of spaced wire windings or a given rubber winding may have wire windings on its radially opposite sides.

The windings, both of rubber and wire, may be discrete loops or may be made by helically winding a single rubber strip or wire. The shape of the assembly as well as the volume of rubber at any position therein may be controlled by varying the tension under which the rubber strip and/or the wire is wound.

10 Claims, 1 Drawing Sheet

METHOD FOR CONSTRUCTING A BEAD REINFORCEMENT WITH ALTERNATE WINDINGS OF POLYMERIC MATERIAL AND AXIALLY SPACED APART WINDINGS OF A WIRE

The present invention relates to bead reinforcement construction and more particulary to the construction of an annular reinforced bead at an opening of a hollow article fabricated from flexible and/or resilient materials and the bead being of a kind adapted to be mounted on a rigid seat, e.g. of metal, to form an air seal therewith.

Examples of such articles are air springs, rolling lobe diaphragms and pneumatic tyres. A common element in the construction of such articles is a liner or carcass ply made from a sheet of a polymeric material in which reinforcing cords are embedded. This liner or ply is wrapped around a cylindrical former or mandrel to form a tube, a bead reinforcement is constructed near each end of the tube, other bead components such as (in the case of a pneumatic tyre) a bead filler or apex are wound over each bead construction and thereafter the ends of the tube projecting beyond the bead assemblies are turned up to fold over or lock into them. Also in the case of a pneumatic tyre the central part of the tube between the bead assemblies is then bowed outwardly to give the carcass ply a toroidal configuration, breaker, tread and sidewall components are added and the completed assembly is cured in a mould.

Bead reinforcements of inextensible material such as wire are necessary to preserve the predetermined diameter of each bead of the tyre enabling it to be seated on the respective flange of a wheel rim and resist unintended dismounting especially when the tyre is inflated. The wire is, however, sheathed in natural or synthetic rubber to prevent damage to the carcass ply wrapped around it and to form a consolidated strong loop. Bead reinforcements have been made from a simple loop of wire tape impregnated with rubber, i.e. a flat rubber strip in which plural, parallel wires are embedded. The overlapping ends of the loop, however, necessarily produce a circumferential unevenness in the finished bead which is pronounced because of the overlap of the tape end. Efforts to produce a less circumferentially uneven bead have included wrapping round the mandrel a single rubber sheathed wire in such a manner as to give a similar section or regular section with improved joint areas. According to United Kingdom Patent Specification GB-A-2179009 a reinforced bead for a pneumatic tyre may be constructed from superimposed layers of rubber-sheathed wire. This latter proposal has the advantage that the shape of the wound bead may easily be varied and both proposals have the advantage that the turned-up carcass ply may be embedded and trapped in the windings of the reinforced bead. However the versatility of the construction even of the latter proposal is limited by the fixed ratio between the volume of rubber and the volume of wire in the finished product imposed by the use of rubber coated wire. Variation of the configuration of the reinforced bead to meet different requirements is also limited by the use of sheathed wire having a predetermined rubber-to-wire volume ratio and spatial relationship.

A principal object of the present invention is to improve upon previous proposals by increasing design flexibility in a simple and cost-effective manner permitting the construction of improved bead reinforcements or bead reinforcements better adapted to particular design requirements.

In accordance with the present invention there is provided a method of constructing a bead reinforcement comprising wrapping around a mandrel or former in superimposed relation successive layers comprising respectively a first flat strip comprising uncured polymeric material and axially spaced-apart windings of an inextensible material, the inextensible material being wound under a tension such that the polymeric material enters the spaces between the axially separated windings annular assembly of the required diametral thickness and cross-sectional shape has been built up in which the polymeric material fills the spaces between the axially separated windings and the windings are surrounded by and embedded in the polymeric material.

Said strip preferably consists wholly of uncured polymeric material.

The windings of inextensible material are preferably stopped before winding of the strip is stopped so that inextensible material is fully enclosed by the polymeric material.

The polymeric material is preferably natural or synthetic rubber and the inextensible material is preferably unsheated wire in single-filament or stranded form.

At least some of the windings forming said layer thereof are preferably made by helically winding a single filament or strand of the inextensible material.

The bead reinforcement may comprise a plurality of layers of axially spaced-apart windings of inextensible material alternating with alternating with a plurality of layers comprising uncured polymeric material. All of the layers of inextensible material may comprise the same, helically wound single filament or strand of the inextensible material. A plurality of spaced-apart single filaments or strands may be helically wound simultaneously so as to produce all of the layers of windings of inextensible material.

In a given layer of the inextensible material one or more of said windings may lie on the radially inner side, and the remainder lie on the radially outer side of the same winding of polymeric strip, additional windings of the polymeric strip extending transversely across the assembly both radially inward and radially outward of said layer.

During its winding the polymeric strip and the inextensible material may be subjected to differential tension thereby to vary the width and thickness of the polymeric material interposed between two layers of windings of the inextensible material.

Figure 2:
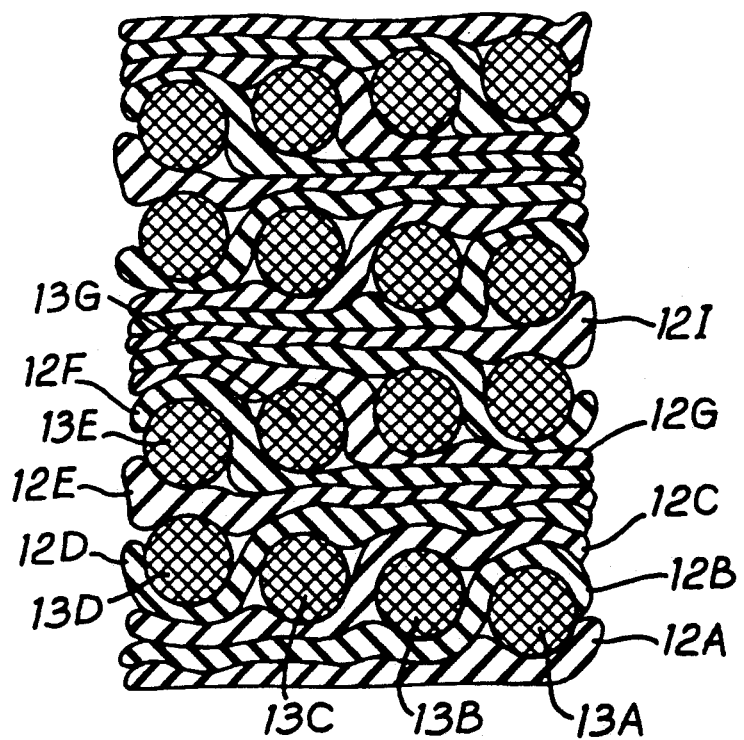

Preferred embodiments of the invention will now be described by way of example with reference to the accompanying diagrammatic drawings, in which:

FIG. 1 is a cross section in a radial plane containing its axis of a first embodiment of a bead reinforcement in accordance with the invention, and FIG. 2 is a similar view of a second embodiment of a bead reinforcement in accordance with the invention.

Referring first to FIG. 1, an elongate strip 10 of uncured rubber, preferably in a warm, sticky condition is wound around a mandrel (not shown). If e.g. a pneumatic tyre or a rolling lobe diaphragm is being manufactured this mandrel, or former, will first have been covered with a tubular carcass ply (not shown) in the form of a sheet of uncured rubber in which reinforcing cords are embedded. The strip 10 is of the width of the intended bead reinforcement and is positioned near one end of the carcass ply so that the end portion of the carcass ply projecting beyond it on the mandrel or former can later be turned up into or over the bead reinforcement. Such techniques are well known per se—see for example United Kingdom Patent Specification No. GB-A-2179009.

After the application of a first turn 10A of the rubber strip to the mandrel or former a layer 11A comprising four axially spaced-apart wires is applied over it. The four wires 11 are unsheathed and are fed immediately after application of the first rubber layer 10A. The wires of the layer 11A may be monofilaments or may be strands of several filaments twisted together.

The four wires are now wound with the rubber strip to form three further successive layers 10B, 10C, 10D and 10E of rubber with wire layers 11A, 11B, 11C and 11D interposed. The four wires 11 are stopped before application of the final rubber turn 10E so that the wire is fully enclosed by the rubber. The height to which the assembly is built (i.e. its radial extent) is determined by the intended dimensions of the bead reinforcement, more or less wire and rubber turns being applied, although rubber layers will always be provided on the radially inner and outer sides of the assembly.

Moreover it should be understood that whereas the accompanying drawings illustrate only bead reinforcements of generally rectangular cross section other cross sectional shapes can be built up by varying the widths of the rubber and wire layers. This can be facilitated either by selecting rubber strip of different widths for different layers or by varying the tension under which the same strip is wound so as to reduce its width.

At any chosen moment during the construction of the bead reinforcement the carcass ply end (not shown) over which it is being built may be turned up and folded over the partially formed reinforcement. The resumption of the winding procedure will entrap the ply end in the reinforcement.

The wires are subjected to tension during winding such that the uncured rubber penetrates the spaces between the turns of wire of each layer 11A-11D. When the assembly is subsequently subjected to curing heat (e.g. after incorporation in a pneumatic tyre which is vulcanised in a mould) each turn of unsheathed wire of each wire layer 11A-11D is embedded in and surrounded by vulcanised rubber and the entire assembly is integrated in that any previous spaces between rubber layers on opposite sides of wire layers have been filled (this includes the space at opposite ends of each wire as well as the spaces between the wires of each layer).

The fact that all wire included in the assembly is fully embedded in rubber even at cut ends of each wire or strand is an important advantage of the present invention. The exposure of metal at the cut end even of a sheathed wire in previous proposals is a serious weakness since corrosion can set in at this point when stored. Although such cut end is subsequently covered during completion of tyre manufacture there will be interval of exposure and an air gap adjacent the cut end in the finished product. Even limited corrosion resulting from this arrangement is deleterious to the finished product.

The embodiment of FIG. 2 differs from that of FIG. 1 primarily in that only a single wire 13 (monofilament or strand) is wound helically, traversing from side-to-side to form the various layers of spaced-apart wire turns throughout the bead reinforcement. After a first turn 12A of rubber is wrapped around the mandrel (or carcass) feeding of the wire 13 commences at the right-hand side of the assembly, as viewed to make a first turn 13A. Necessarily the second turn 13B of wire is on the opposite side of the second turn 12B of rubber to the first rubber turn 12A. Similarly the third turn 13C of wire is separated from the second turn 13B by the third turn 12C of rubber, and the final turn 13D of wire in the first layer is separated from the third turn 13C by a fourth turn 12D of rubber.

The direction of traverse of the wire winding head is now reversed. After a fifth turn 12E of rubber has been wound over all the wire turns 13A-13D of the first layer of wire a second layer of wire commences with a first turn 13E. This is overlaid by a sixth turn 12F of rubber with further layers such as 12I of rubber and layers of wire and so on, the second layer of wire with interleaved rubber being constructed similarly but oppositely to the first layer.

The process is continued followed by a second turn 13G of wire of the second layer of wire and a seventh turn 12G of rubber until a bead reinforcement of the desired dimensions is built up. If desired the assembly may be subjected to compacting pressure and to heat to produce an integrated body of vulcanised or partially vulcanised rubber in which the individual turns of wire filament or strand are fully embedded even at the ends of the or each wire.

We claim:

1. A method of constructing a bead reinforcement comprising wrapping around a mandrel or former consecutively in superimposed relation layers respectively comprising a flat strip of uncured polymeric material and axially spaced apart windings of an inextensible material, the inextensible material being wound under a tension such that the polymeric material enters said axial spaces between the windings of said layer of windings, and continuing the wrapping until an annular assembly of the required diametral thickness and cross-sectional shape has been built up in which the polymeric material fills the spaces between the axially separated windings of said layer of windings and the axially separated windings of said layer of windings are surrounded by and embedded in the polymeric material.

2. A method as claimed in claim 1, wherein a plurality of layers each comprising a flat strip of uncured polymeric material and a plurality of layers each comprising axially spaced apart windings of an inextensible material are wrapped around the mandrel or former in such a way that each said layer of windings is sandwiched between two layers of uncured polymeric material.

3. A method as claimed in claim 2, wherein a single filament or strand of the inextensible material is helically wound to form at least some of the windings of all of the layers of windings.

4. A method as claimed in claim 2, wherein each said layer of said flat strip consists wholly of uncured polymeric material.

5. A method as claimed in claim 2 wherein the windings of inextensible material are stopped before winding of the strip is stopped so that inextensible material is fully enclosed by the polymeric material.

6. A method as claimed in claim 2 wherein the polymeric material is natural or synthetic rubber and the inextensible material is unsheathed wire in single-filament or stranded form.

7. A method as claimed in claim 2 wherein during their winding the polymeric strip and the inextensible material are subjected to differential tension thereby to vary the width and thickness of the polymeric material interposed between two layers of windings of the inextensible material.

8. A method as claimed in claim 1, wherein the windings forming said layer of windings are made by simultaneously helically winding a plurality of axially spaced apart single filaments or strands of inextensible material.

9. A method as claimed in claim 1, wherein a first layer of polymeric material is applied to the mandrel or former, a first winding of inextensible material is applied to said first layer, a second layer of polymeric material is wound over said first winding to extend across said first layer, a second winding of inextensible material is applied to said second layer in side-by-side, axially spaced relation to said first winding and a third layer of polymeric material is wound over said second winding to extend across said second layer.

10. A method of constructing a bead reinforcement comprising wrapping around a mandrel or former consecutively in superimposed relation layers respectively comprising a flat strip of uncured polymeric material and axially spaced apart helical windings of a single filament or strand of an inextensible material, the inextensible material being wound under a tension such that the polymeric material enters between the axially separated windings of said layer of windings until an annular assembly of the required diametral thickness and cross-sectional shape has been built up in which the polymeric material fills the spaces between the axially separated windings and the axially separated windings are surrounded by and embedded in the polymeric material.

* * * * *